United States Patent
Chida et al.

(10) Patent No.: US 12,111,327 B2
(45) Date of Patent: Oct. 8, 2024

(54) AUTOMATIC ANALYZER WITH A CONTROL UNIT FOR DISPLAYING BACKGROUND MAINTENANCE OPERATION NOTIFICATIONS

(71) Applicant: HITACHI HIGH-TECH CORPORATION, Tokyo (JP)

(72) Inventors: Satoru Chida, Tokyo (JP); Masashi Akutsu, Tokyo (JP); Chikook Ha, Tokyo (JP); Satoshi Yokotsuka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 876 days.

(21) Appl. No.: 17/276,906

(22) PCT Filed: Nov. 13, 2019

(86) PCT No.: PCT/JP2019/044472
§ 371 (c)(1),
(2) Date: Mar. 17, 2021

(87) PCT Pub. No.: WO2020/116106
PCT Pub. Date: Jun. 11, 2020

(65) Prior Publication Data
US 2021/0356483 A1    Nov. 18, 2021

(30) Foreign Application Priority Data

Dec. 6, 2018   (JP) .................. 2018-228789

(51) Int. Cl.
*G01N 35/00* (2006.01)
(52) U.S. Cl.
CPC . *G01N 35/00732* (2013.01); *G01N 35/00623* (2013.01); *G01N 2035/009* (2013.01); *G01N 2035/0091* (2013.01)

(58) Field of Classification Search
CPC ....... G01N 35/00732; G01N 35/00623; G01N 2035/009; G01N 2035/0091; G01N 2035/00891
(Continued)

(56) References Cited

U.S. PATENT DOCUMENTS 5,695,718 A * 12/1997 Imai ................. G01N 35/00594
 422/65
5,966,676 A * 10/1999 Fujiwara .......... G01N 35/00712
 250/252.1
(Continued)

FOREIGN PATENT DOCUMENTS

EP     2 846 258 A1    3/2015
JP     09211003 A  *   8/1997
(Continued)

OTHER PUBLICATIONS

Scafuri, C, Proceedings of ICALEPCS2011 2011, 263-266. (Year: 2011).*

(Continued)

*Primary Examiner* — Arlen Soderquist
(74) *Attorney, Agent, or Firm* — MATTINGLY & MALUR, PC

(57) ABSTRACT

The automatic analyzer is capable of performing other operations concurrently with a maintenance operation and notifying a user when a user action is required in executing maintenance and displaying guidance. Automatic analyzer includes analysis modules and that analyze a sample, a display device that displays information related to maintenance in the analyzer including the analysis modules and, and an overall management computer that controls a constant display area to be displayed on a display screen of the display device, in which when there is a need to notify a user of a maintenance status at a timing when the maintenance in the analyzer is executed in a background and a screen other (Continued)

than a maintenance screen is displayed on the display device, the overall management computer displays notification information on the screen including global areas and of the display device.

15 Claims, 9 Drawing Sheets

(58) Field of Classification Search
    USPC .................. 422/63–67; 436/43–55, 172–173
    See application file for complete search history.

(56) References Cited

U.S. PATENT DOCUMENTS

| | | | | |
|---|---|---|---|---|
| 6,217,731 | B1* | 4/2001 | Kane | G01N 27/44782 204/451 |
| 6,369,893 | B1* | 4/2002 | Christel | G01N 21/0332 356/417 |
| 6,509,192 | B1* | 1/2003 | Young | G01N 33/5094 436/15 |
| 2005/0013736 | A1* | 1/2005 | McKeever | G01N 35/025 422/65 |
| 2005/0175506 | A1* | 8/2005 | Matsubara | G01N 35/00712 422/68.1 |
| 2007/0077643 | A1* | 4/2007 | Nakamura | G01N 35/00722 435/286.1 |
| 2007/0078631 | A1* | 4/2007 | Ariyoshi | G16H 40/63 702/189 |
| 2008/0050280 | A1* | 2/2008 | Fujita | G01N 35/0092 422/67 |
| 2008/0279048 | A1* | 11/2008 | Wakamiya | G01N 35/0092 368/10 |
| 2010/0223556 | A1* | 9/2010 | Wakabayashi | G01N 35/00871 715/822 |
| 2010/0271479 | A1* | 10/2010 | Heydlauf | G01N 33/54366 715/830 |
| 2011/0039349 | A1* | 2/2011 | Hamada | G01N 35/00871 702/19 |
| 2011/0184536 | A1* | 7/2011 | Tanoshima | G16H 10/40 700/73 |
| 2012/0029934 | A1* | 2/2012 | Shindo | G01N 35/00871 705/2 |
| 2012/0046203 | A1* | 2/2012 | Walsh | A61B 5/150351 422/69 |
| 2012/0064636 | A1* | 3/2012 | Mitsuyama | G01N 35/00623 422/50 |
| 2013/0122596 | A1* | 5/2013 | Kamihara | G16C 20/10 702/32 |
| 2013/0184548 | A1* | 7/2013 | Matsumura | A61B 5/743 600/365 |
| 2013/0201019 | A1* | 8/2013 | Yamaguchi | G08B 5/36 340/540 |
| 2013/0207812 | A1* | 8/2013 | Heydlauf | G01N 35/00871 340/691.6 |
| 2013/0260414 | A1* | 10/2013 | Yao | G01N 35/00712 436/63 |
| 2014/0129153 | A1* | 5/2014 | Uratani | G01N 33/0062 702/22 |
| 2014/0202828 | A1* | 7/2014 | Ishigami | G01N 35/1009 198/340 |
| 2014/0239060 | A1* | 8/2014 | Thomas | G01N 35/00613 235/375 |
| 2014/0250339 | A1* | 9/2014 | Ishii | G01N 35/00623 714/57 |
| 2015/0260742 | A1* | 9/2015 | Nakajima | G01N 35/00613 422/63 |
| 2016/0070862 | A1* | 3/2016 | Rivers | G16H 10/40 702/19 |
| 2019/0206559 | A1* | 7/2019 | Suzuki | H04L 41/069 |
| 2019/0237190 | A1* | 8/2019 | Frone | G01N 35/00871 |

FOREIGN PATENT DOCUMENTS

| | | | | |
|---|---|---|---|---|
| JP | 2000-097946 | A | | 4/2000 |
| JP | 2003-83960 | A | | 3/2003 |
| JP | 2008-96182 | W | | 4/2008 |
| JP | 2009216705 | A | * | 9/2009 ....... G01N 35/00732 |
| JP | 2010-249757 | A | | 11/2010 |
| JP | 2015-92197 | A | | 5/2015 |
| JP | 2018040621 | A | * | 3/2018 ....... G01N 35/00623 |
| WO | 2009/085534 | A1 | | 7/2009 |
| WO | 2013/035471 | A1 | | 3/2013 |
| WO | 2018/163745 | A1 | | 9/2018 |

OTHER PUBLICATIONS

Japanese Office Action Received in corresponding Japanese Application No. 2020-559850 dated Jul. 5, 2022.
International Search Report of PCT/JP2019/044472 dated Jan. 28, 2020.
Extended European Search Report received in corresponding European Application No. 19891886.4 dated Aug. 8, 2022.

* cited by examiner

AUTOMATIC ANALYZER WITH A CONTROL UNIT FOR DISPLAYING BACKGROUND MAINTENANCE OPERATION NOTIFICATIONS

TECHNICAL FIELD

The present invention relates to an automatic analyzer that qualitatively and quantitatively analyzes biological samples (hereinafter referred to as samples) such as blood and urine, and more particularly relates to an automatic analyzer having a maintenance function for maintaining analytical behavior.

BACKGROUND ART

As an example of automatic analyzers having a function that accurately determines the performance of a device and the state of a mechanism according to a measurement result of quality control samples, a measurement result of general sample samples, normality and abnormality of a detector, and so on, and takes countermeasures by a simple method, Patent Literature 1 discloses an automatic analyzer that compares conditions such as the measurement result of the quality control sample, the measurement result of the general sample samples, the normality and abnormality of the detector with standards (algorithm) for determining the device state, automatically displays a countermeasure menu, and selects and executes any countermeasure from the same menu screen on which the countermeasure menu is displayed without transitioning to another screen.

In addition, as an example of the automatic analyzers that is provided with a screen display which is easily operable by busy operators and operators who are unfamiliar with the automatic analyzers, Patent Literature 2 discloses an automatic analyzer that provides a constant display area that always displays the measurement result or the like in a part of a screen display of a display device for displaying the measurement results, and displays information on multiple types of items related to an interrupt work that occurs during a routine such as the measurement situation of the sample, alarm information that has occurred, and maintenance information while automatically switching the information in real time. Patent Literature 2 also discloses that when the operator selects the constant display area for request, the screen transmits to a screen indicative of a screen display for displaying the information related to the item in the display.

PRIOR ART LITERATURE

Patent Literature

Patent Literature 1: Japanese Unexamined Patent Application Publication No. 2000-97946
Patent Literature 2: Japanese Unexamined Patent Application Publication No. 2010-2497757

SUMMARY OF THE INVENTION

Problems to be Solved by the Invention

The automatic analyzers that automatically perform quantitative and qualitative analysis of samples remarkably spread mainly in large hospitals and clinical laboratory centers that are required to process many patient samples in short time. The automatic analyzers that have various processing capabilities of large, medium, and small depending on the processing capacity are developed.

In those automatic analyzers, regular maintenance operation is required to ensure higher reliability. On the other hand, high processing power and the quickness of a result output are required.

For that reason, in the automatic analyzer used especially in facilities where many patient samples are processed in one day, it is desirable that the device is not allowed to stop the device as much as possible to output the measurement result as soon as possible.

To meet the above desirability, it is desirable that the maintenance operation can be simplified and completed in a short amount of time. As such an automatic analyzer, for example, the technology disclosed in Patent Literature has been known.

In order to reduce a device downtime, the device maintenance by inspection technicians implements technology to perform multiple device maintenance operations in parallel so that the efficient maintenance is performed.

When a guidance display function is installed to improve operability at the time of performing the maintenance as in the device disclosed in Patent Literature 1 described above, if the maintenance screen is still displayed, a guidance is displayed on the screen so that maintenance can proceed smoothly. However, it has been that there is room for improvement as follows.

For example, while performing an operation, the screen for performing the operation may be controlled so as not to move to another screen. When another operation is performed in parallel with the maintenance operation, the maintenance screen transitions to a screen for performing another operation.

In those cases, in order to again display the maintenance screen in which the guidance described above is displayed, the user himself is required to reach the maintenance screen in which the guidance is displayed. However, to meet the above requirement, the user needs to be accustomed to the operation of the device to some degree, and it takes sometime to move the screen. For that reason, obviously, it is desirable to perform display easily operable even by busy operators and operators unfamiliar with the automatic analyzers.

Further, in Patent Literature 2, information on maintenance is always displayed on the screen. However, the main purpose of Patent Literature 2 is to display a time required until the maintenance is completed, and it is found that there is room for improvement as follows, as in Patent Literature 1.

For example, also in Patent Literature 2, in order to display the maintenance screen in which the guidance is displayed as described above, the user himself is required to reach the maintenance screen in which the guidance is displayed. Similarly, obviously, it is desirable to perform display easily operable.

An object of the present invention is to provide an automatic analyzer capable of executing another operation in parallel with maintenance operation, and capable of performing guidance display by communicating with a user when a user action is required during maintenance.

Means for Solving the Problems

The present invention includes multiple means for solving the above problems, and an example of the multiple means is directed to an analyzer that includes an analysis unit that analyzes a sample; a display device that displays information related to maintenance in the analyzer including the analysis unit; and a control unit that controls a constant display area to be displayed on a display screen of the display device, in which when there is a need to notify a user of a maintenance status at a timing when the maintenance in the analyzer is executed in a background and a screen other than a maintenance screen is displayed on the display device, the control unit displays notification information on the screen including the constant display area of the display device.

Advantages of the Invention

According to the present invention, other operations can be performed in parallel with the maintenance operation, and guidance display can be performed by communicating with a user when a user action is required during maintenance. Problems, Configurations, and effects other than those described above will be clarified by the description of the following embodiments.

MODE FOR CARRYING OUT THE INVENTION

An automatic analyzer according to an embodiment of the present invention will be described with reference to FIGS. 1 to 14.

Figure 1:
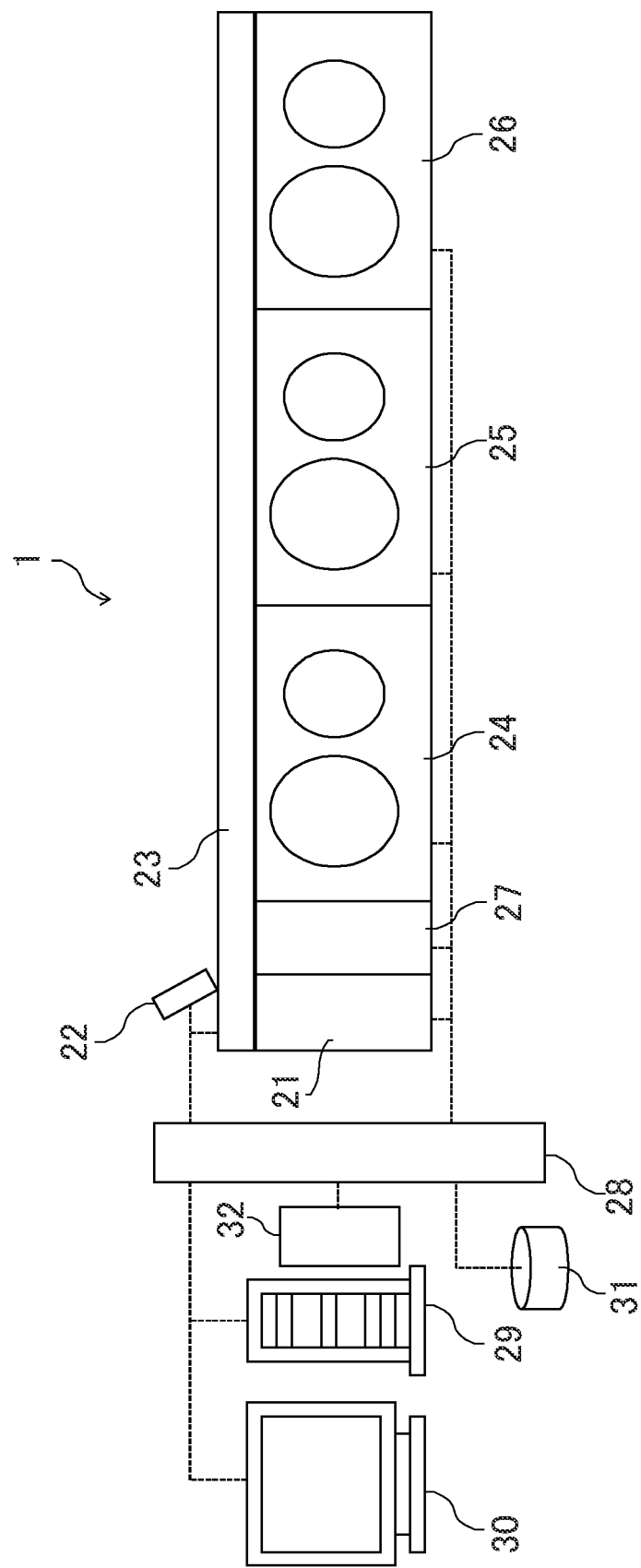
FIG. 1 is a system block diagram showing an overall configuration of an automatic analyzer according to an embodiment of the present invention.

First, the overall configuration of an automatic analyzer according to a preferred embodiment of the present invention will be described with reference to FIG. 1. FIG. 1 is a system block diagram showing the overall configuration of the automatic analyzer according to the embodiment of the present invention.

As shown in FIG. 1, an automatic analyzer 1 according to the present embodiment includes a sample rack input unit 21, an ID reading unit 22, a transportation line 23, analysis modules 24, 25, and 26, sample rack collection unit 27, and an overall management computer 28.

Figure 2:
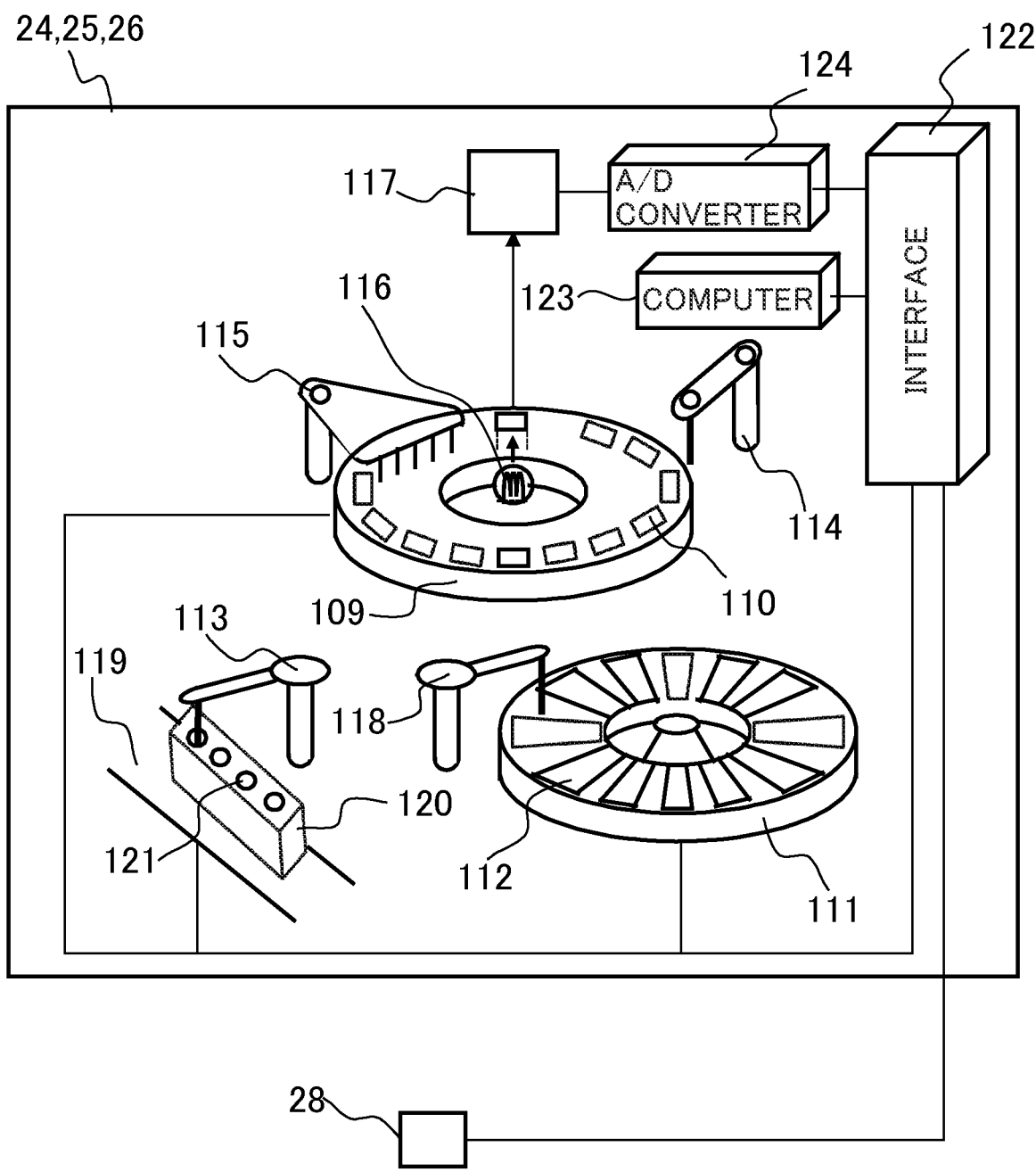
FIG. 2 is a schematic diagram showing an overall configuration of a configuration example of an analysis module in the automatic analyzer according to the embodiment of the present invention.

The sample rack input unit 21 is a portion for loading multiple sample racks 120 (see FIG. 2) each holding multiple sample containers 121 (see FIG. 2).

The sample container 121 held by the sample rack 120 is attached with a label or barcode on which a sample ID indicative of attribute information (reception number, patient name, requested analysis item, etc.) related to an inspection sample (specimen) such as blood is recorded. In addition, the sample rack 120 itself is attached with a tag indicative of a rack ID showing rack identification information such as a rack number.

The sample rack 120 placed in the sample rack input unit 21 is transported by the transportation line 23. At that time, information on the sample ID and the sample rack ID is read by the ID reading unit 22 and transmitted to the overall management computer 28.

The transportation line 23 transport the sample racks 120 loaded from the sample rack input unit 21 to the targeted analysis modules 24, 25, and 26 according to analysis requests made by users such as inspection technicians or doctors. In addition, the transportation line 23 is a device that transports the sample racks 120 that have been subjected to the analysis in the analysis modules 24, 25, and 26, or the sample racks 120 that have not been subjected to the analysis request to the sample rack collection unit 27.

The transportation line 23 is configured to identify the sample racks 120 having different shapes, separate the transportation operation according to the shape of the sample racks 120, and transport the sample racks 120 to the analysis modules 24, 25, and 26.

The analysis modules 24, 25, and 26 are modules that execute the analysis of the samples in the sample containers 121 held by the sample rack 120 transported through the transportation line 23. The analysis modules 24, 25, and 26 are disposed along the transportation line 23, and connected to the transportation lines 23 in a removable manner.

The number of analysis modules 24, 25, 26 can be set arbitrarily, and at least one analysis module may be disposed. The present embodiment shows the case where the number of modules is three.

The overall management computer 28 is a computer equipped with a CPU, a memory, and the like, and performs necessary control in the sample rack input unit 21, the ID reading unit 22, the transportation line 23, and the sample rack collection unit 27.

For example, the overall management computer 28 determines which of the analysis modules 24, 25, and 26 is used to execute the control from the requested analysis item based on the attribute information read by the ID reading unit 22.

Further, the overall management computer 28 according to the present embodiment performs a screen display control for a display screen of the display device 30 on which various information such as information related to the sample, information related to the analysis item, and information related to the analysis result is displayed. Further, the overall management computer 28 executes the control for displaying various screens related to the operation of the automatic analyzer 1 such as information related to an operation screen for starting analysis, a progress status of the analysis, a screen for instructing the execution of maintenance, and a progress of the maintenance. The overall management computer 28 corresponds to a control unit.

The overall management computer 28 according to the present embodiment particularly executes the display control for securing an area which is always displayed in those various screens. The area (constant display area) which is always displayed is, for example, an area such as a global area 701 in FIG. 7 and a global area 901 in FIG. 11 in which a maintenance button 7, an alarm button, a print button, a stop button, a start button, and so on are displayed.

The global areas 701 and 901 are always displayed on the display screen of the display device 30, and therefore, screens shown in FIGS. 4, 5, 6, 8, 9, 10, 13, and 14, which will be described later, are displayed in a portion of a sample/item information display area 705. Details of each of those figures will be described later. If the global area 701 and 901 remain displayed, the screen shown in FIG. 4 may be displayed in a pop-up area such as a pop-up area 902 shown in FIG. 11, and so on.

Further, the overall management computer 28 according to the present embodiment executes control for displaying notification information on the screen including the global areas 701 and 901 of the display device 30 when there is a need to notify the user of the maintenance status at the timing where the maintenance in the device is executed in a background, and a screen other than the maintenance screen is displayed on the display device 30. The details of the control will be described later.

The overall management computer 28 is further connected with an operation unit 29 formed of a keyboard or a mouse for entering data, a display device 30 for displaying data, a printing device 32 for printing data, a storage device 31 for storing analysis instruction information and measurement results, and so on.

The display device 30 is a display equipment such as a liquid crystal display for displaying the analysis results, the analysis progress status, and information related to the maintenance in the device including the analysis modules 24 and 25.

The storage device 31 is a recording medium including a semiconductor memory such as a flash memory or a magnetic disk such as an HDD, which records data on a sample input into the automatic analyzer 1 or the analysis results. The storage device 31 also records various computer programs for controlling the operation of each equipment in the automatic analyzer 1 and executing various display processes to be described later.

Next, the outline of the configuration of the analysis modules 24, 25, and 26 will be described with reference to FIG. 2. FIG. 2 is a schematic diagram of the overall configuration of each analysis module in principle.

In FIG. 2 described below, an example of a biochemical analysis module that analyzes a so-called biochemical analysis item as an analysis module is shown. However, the analysis module placed in the automatic analyzer is not limited to the biochemical analysis module, but may be a module for analyzing other analysis items such as an immunoassay module that analyzes an analysis item of immunity. Also, one or more modules for analyzing different analysis items may be disposed.

Further, the biochemical analysis module is not limited to the form shown in FIG. 2, and may be equipped with an analysis equipment for measuring an analysis item, for example, an electrolyte.

In FIG. 2, each of the analysis modules 24, 25, and 26 includes a reaction disk 109, a reagent disk 111, a rack transportation belt 119, a reagent dispensing probe 118, a sample dispensing probe 113, a stirring device 114, a light source 116, a multi-wavelength photometer 117, a cleaning device 115, and a computer 123.

Reaction vessels 110 are arranged on the circumference of the reaction disk 109. The rack transportation belt 119 that moves the sample racks 120 on which the sample containers 121 are placed is installed in the vicinity of the reaction disk 109.

The sample dispensing probe 113 that is rotatable and movable up and down is installed between the reaction disk 109 and the rack transportation belt 119. The sample dispensing probe 113 disperses the sample from the sample containers 121 to the reaction vessels 110 while moving arcuately around the axis of rotation.

Multiple reagent bottles 112 can be placed on the circumference in the reagent disk 111. The reagent disk 111 is kept cold and is covered with a cover provided with a suction port.

A reagent dispensing probe 118, which is rotatable and movable up and down, is installed between the reaction disc 109 and the reagent disc 111. The reagent dispensing probe 118 moves arcuately around the axis of rotation, accesses to the inside of the reagent disk 111 from the suction port, and dispenses the reagent from the reagent bottles 112 to the reaction vessels 110.

The cleaning device 115, the light source 116, and the multi-wavelength photometer 117, and the stirrer device 114 are disposed around the reaction disk 109. A cleaning tank (not shown) is installed in an operating range of each of the reagent dispensing probe 118, the sample dispensing probe 113, and the stirring device 114.

The sample containers 121 contain the sample, are placed on the sample rack 120 and carried by the rack transportation belt 119 through the transportation line 23.

The computer 123 is configured by a computer equipped with a CPU, a memory, and so on, and connected to respective mechanisms in the analysis modules 24, 25, and 26 described above through an interface 122. The computer 123 controls all the operations of those mechanisms, and performs arithmetic processing to obtain the concentration of a predetermined component in a liquid sample such as blood or urine. The computer 123 is also connected to the overall management computer 28 through the interface 122.

The general configuration of the automatic analyzer 1 is described above.

The analysis processing of the sample by the automatic analyzer 1 as described above is generally performed in the following order.

The operator uses the display device 30 and the operation unit 29 to give an analysis instruction to the automatic analyzer 1. The analysis instruction is stored in the storage device 31 and transmitted to a target analysis module of the analysis modules 24, 25, and 26 through the whole management computer 28. The target analysis module performs an analysis operation according to the received analysis instruction as follows.

In the analysis modules 24, 25, and 26, first, the samples in the sample containers 121 placed on the sample rack 120 that is transported in the vicinity of the reaction disk 109 by the rack transportation belt 119 through the transportation line 23 are dispensed into the reaction vessels 110 on the reaction disk 109 by a predetermined amount by the sample dispensing probe 113.

After the completion of dispensing from one sample container 121, the rack transportation belt 119 allows the sample rack 120 to move so that the next sample container 121 comes to directly below the sample dispensing probe 113. After the completion of dispensing from all the sample containers 121 on the sample rack 120, the sample rack 120 is carried out by the rack transportation belt 119.

The reaction vessels 110 into which the sample has been dispensed rotationally move on the reaction disk 109 by the rotational operation of the reaction disk 109. Meanwhile, the reagent dispensing probe 118 dispenses the reagent used for the analysis to the sample in the reaction vessels 110 from the reagent bottle 112 on the reagent disk 111.

Subsequently, the stirring device 114 stirs a reaction solution of the sample and the reagent in the reaction vessel 110. Stir.

Thereafter, a light generated from the light source 116 is transmitted through the reaction vessel 110 containing the reaction solution, and a luminous intensity of the transmitted light is measured by the multi-wavelength photometer 117.

An absorbance signal measured by the multi-wavelength photometer 117 is transmitted to the computer 123 through the A/D converter 124 and the interface 122.

The computer 123 calculates calibration curve data according to set concentration data in the case of a standard solution sample, based on an analysis method set for each test substance in advance from the absorbance signal, and calculates the concentration data according to the calibration curve data obtained by measurement of the standard solution sample in the case of a patient sample and a control sample. Those pieces of data are transmitted as measurement results to the overall management computer 28 through the interface 122, after adding information that symbolizes the type of sample.

At the same time, the reaction vessel 110 whose analysis has been completed is cleaned by the cleaning device 115, and used for the next analysis.

The overall management computer 28 stores the received measurement results in the storage device 31, and outputs the measurement results to the display device 30 and the printing device 32.

The automatic analyzer is not limited to the configuration including the multiple analysis modules shown in FIG. 1. In some cases, the automatic analyzer may be configured by a single unit of each analysis module shown in FIG. 2. In such a case, the computer 123 in FIG. 2 may be equipped with various functions equivalent to those of the overall management computer 28.

Figure 3:
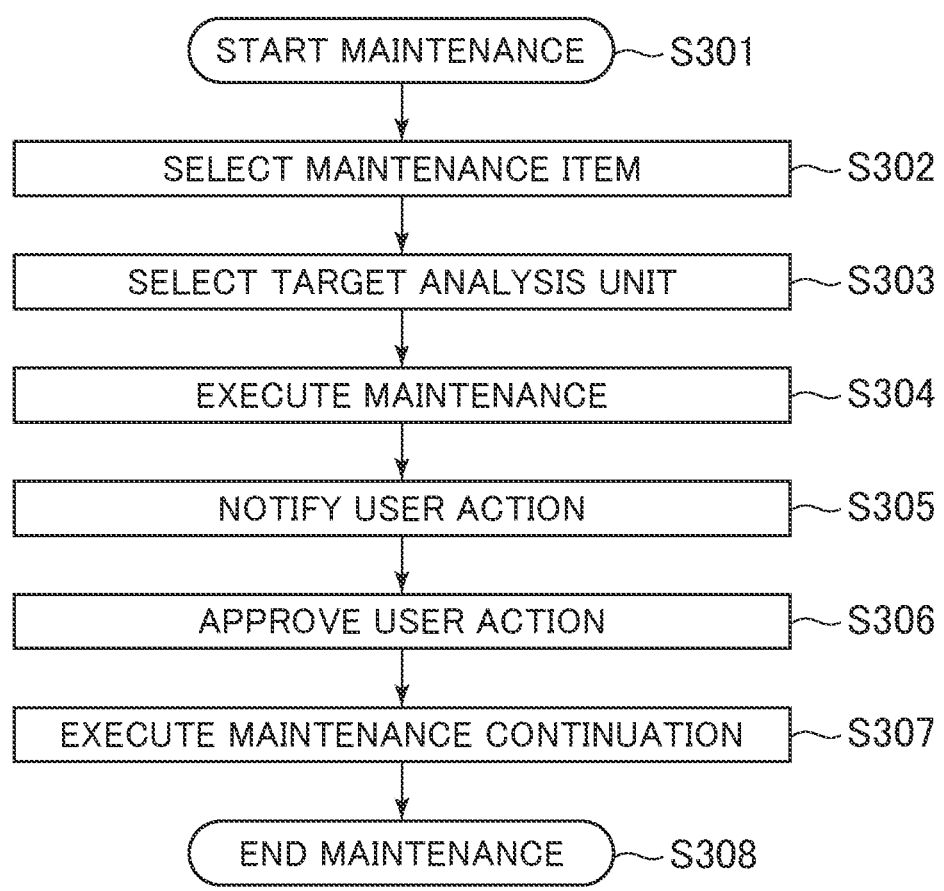
FIG. 3 is a diagram showing a maintenance execution flow of the automatic analyzer according to the present embodiment.

Next, the details of the maintenance operation in the automatic analyzer 1 according to the present embodiment will be described with reference to FIG. 3 and the subsequent figures. A maintenance flow will be first described with reference to FIG. 3. FIG. 3 is a diagram showing a maintenance implementation flow in the automatic analyzer according to an embodiment of the present invention.

The control of the automatic analyzer 1 in an operation flow shown in FIG. 3 is performed by the overall management computer 28. In addition, screens displayed in FIGS. 4 to 14 are displayed on the display device 30.

In FIG. 3, an operator automatically gives the automatic analyzer 1 a maintenance start instruction with using the display device 30 and the operation unit 29. The overall management computer 28 starts the maintenance process based on the start instruction (Step S301). 301).

Figure 4:
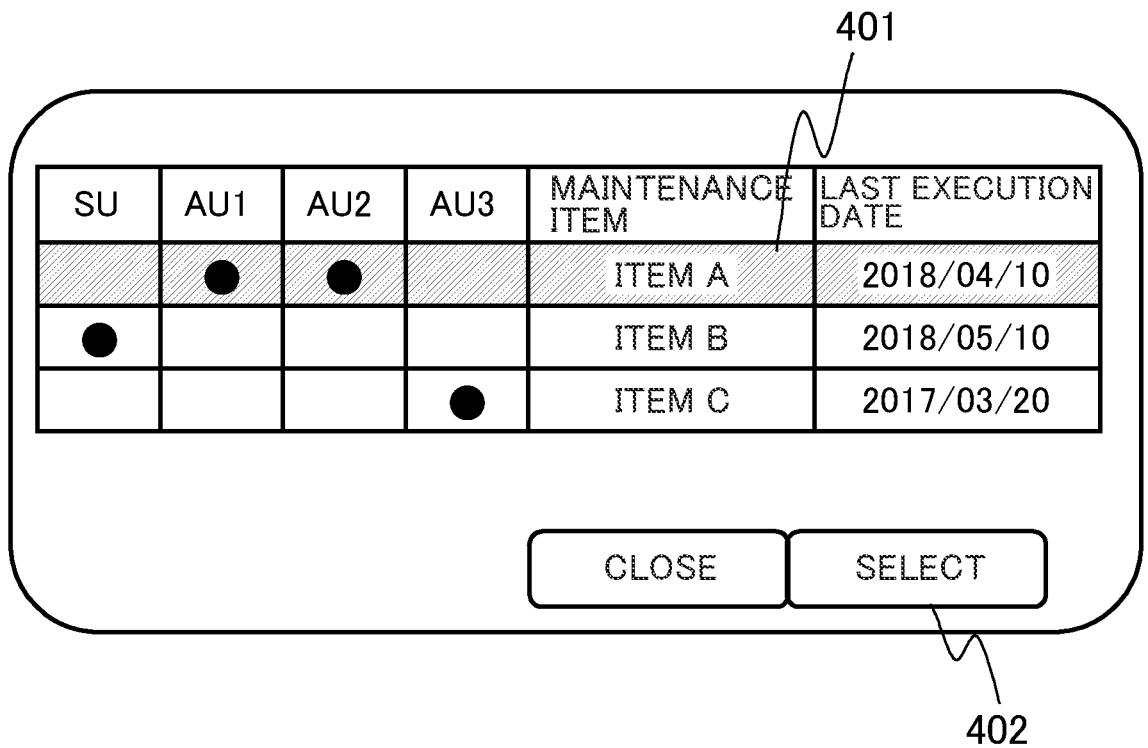
FIG. 4 is a diagram showing a maintenance selection screen of the automatic analyzer according to the present embodiment.

Next, the overall management computer 28 allows a maintenance selection screen shown in FIG. 4 to be displayed on the display device 30 (Step S302). This allows the user to operate the operation unit 29 and select a maintenance item with using a maintenance item button 401 (Step S302).

Figure 5:
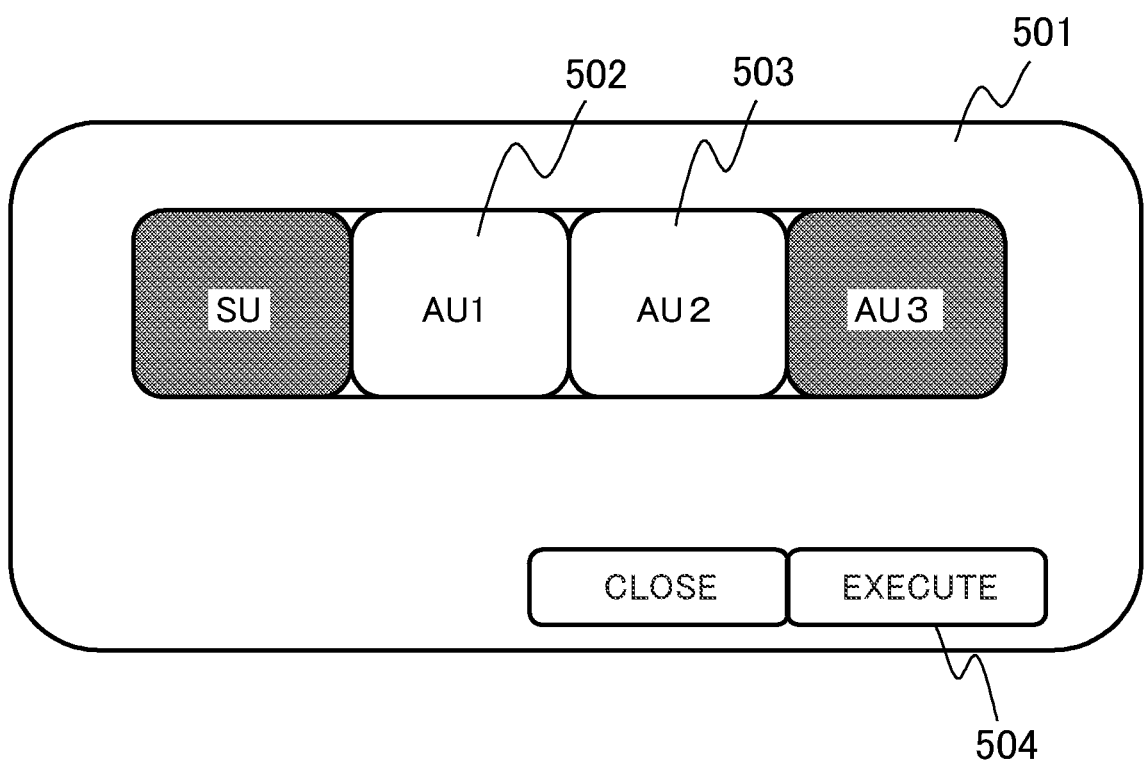
FIG. 5 is a diagram showing a maintenance execution screen of the automatic analyzer according to the present embodiment.

When recognizing that a selection button 402 has been pressed, the overall management computer 28 allows a maintenance execution screen 501 shown in FIG. 5 to be displayed on the display device 30. In the maintenance execution screen 501, the overall management computer 28 allows the user to select an AU (analysis unit: analysis module) 1 and an AU2 to be subjected to the execution of maintenance with using execution target analysis module selection buttons 502 and 503, and press an execution button 504 to the maintenance (Step S304).

The maintenance execution screen 501 in FIG. 5 is an example in which the automatic analyzer 1 has multiple analysis modules 24, 25, and 26, for selecting a target module from a sampler module (SU) configured by the sample rack input unit 21, the transportation line 23, and the sample rack collection unit 27, and the respective analysis modules 24, 25, and 26 (AU1, AU2, AU3).

Thereafter, the overall management computer 28 executes the display control for a user action notification when the notification of a user action (notification information) is required during maintenance (Step S305).

Figure 6:
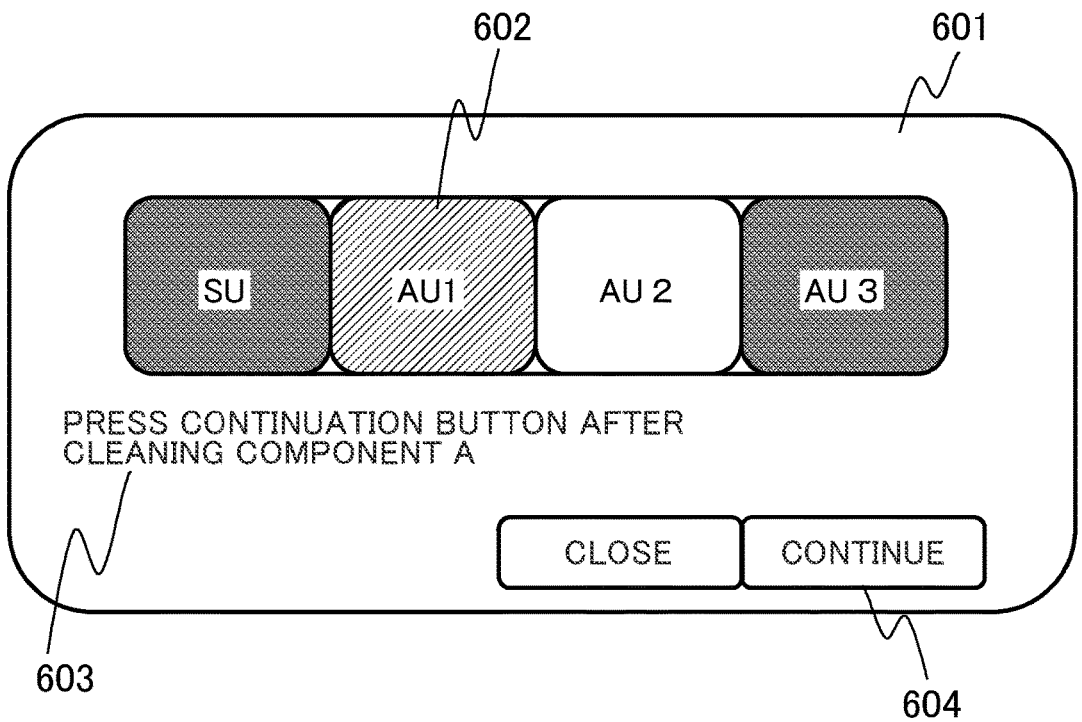
FIG. 6 is a diagram showing a maintenance user action notification screen of the automatic analyzer according to the present embodiment.

Hereinafter, as the user action notification, the operation to be next executed by the user is displayed on the maintenance execution screen 501 shown in FIG. 5. A case of transitioning to a maintenance execution screen 601 shown in FIG. 6 will be described. FIG. 6 shows an example of a screen display for performing the user action notification.

On the maintenance execution screen 601 shown in FIG. 6, a module button 602 of the target unit is highlighted to execute the notification display on a user action notification area 603. By referring to the above notification display, the user can easily grasp the details of a work required for the user during maintenance.

The user cleans a part A based on a message of "after cleaning the part A, press a continuation button" displayed in the user action notification area 603, and press the continuation button 604 after completion of the cleaning to continue the maintenance.

Further, on the maintenance execution screen 601 shown in FIG. 6, the user can confirm for which analysis module the user action notification is displayed, according to highlighting such that the module button 602 blinks or a display color changes. FIG. 6 shows an example in which a display pattern of the analysis module is changed and displayed.

The user confirms the user action notification by the display of the maintenance execution screen 601 and implements the action.

The maintenance execution screen 501 shown in FIG. 5 and the maintenance execution screen 601 shown in FIG. 6 are screen displays different for each maintenance item, and the maintenance execution screen that is displayed when another maintenance item is executed can be different from the screens shown in FIGS. 5 and 6.

After executing the action, the user operates the operation unit 29 and presses the continuation button 604. When it is recognized that the continuation button 604 has been pressed (Step S306), the overall management computer 28 can continuously execute the maintenance operation as the user action approval execution (Step S307).

Thereafter, when it is determined that all the necessary maintenance operation has been executed, the overall management computer 28 terminates the maintenance operation (Step S308).

Hereinafter, a notification method of the user action notification when the user action notification is required, and an example of the maintenance operation when another screen is displayed will be described with reference to FIGS. 7 to 14 in the case where the maintenance execution screen 501 is closed by the user's operation before the user action notification shown in Step S305 of FIG. 3 is implemented and another screen is displayed on the display device 30 during maintenance.

Hereinafter, as one of the maintenance operations in the automatic analyzer 1, an example of displaying the notification information for confirming the user action in the maintenance while the measurement result display screen is displayed, and the measurement result of the measured sample information is verified will be described.

Figure 7:
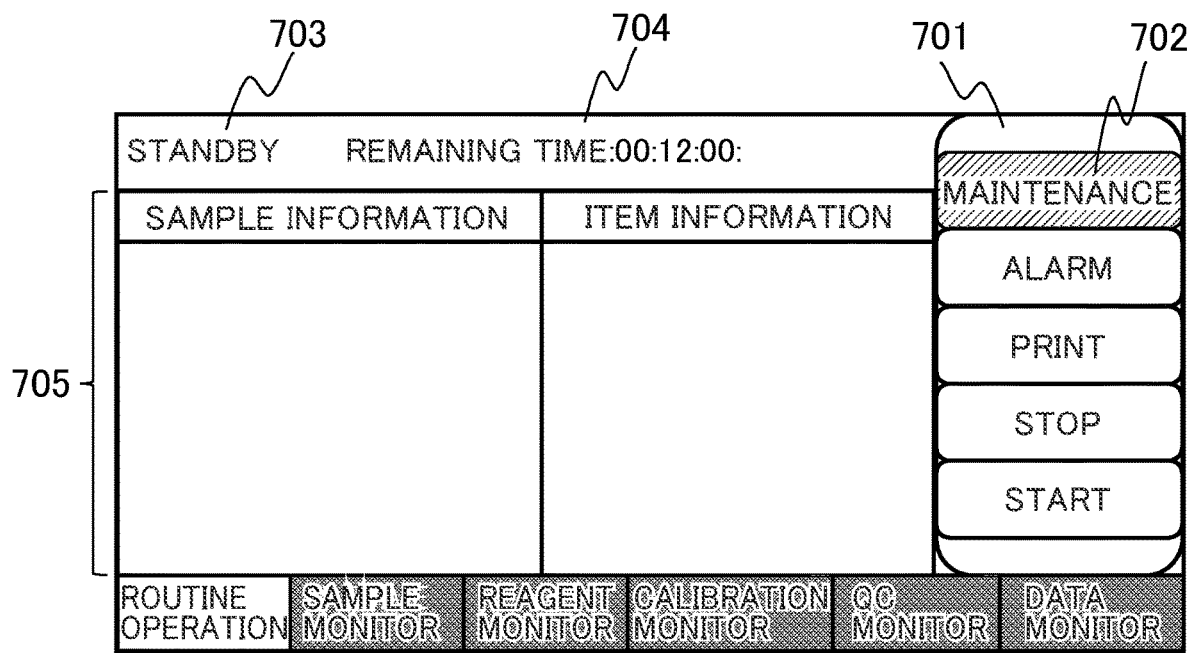
FIG. 7 is a diagram showing a user action notification screen using an always-displayed area of the automatic analyzer according to the present embodiment.

First, an example of the screen for performing the display control of the user action notification (notification information) using the constant display area will be described with reference to FIG. 7. FIG. 7 is a diagram showing an example of a screen notation for performing the user action notification using the constant display area in the automatic analyzer according to the present embodiment.

In the maintenance being executed in a background when a screen other than the maintenance screen is displayed, when a work required to be carried out by the user himself is required, the overall management computer 28 performs the display control for the user action notification.

Specifically, the overall management computer 28 displays a maintenance button 702 displayed in the global area 701 with a change in color. This allows the user action notification to be implemented.

Figure 8:
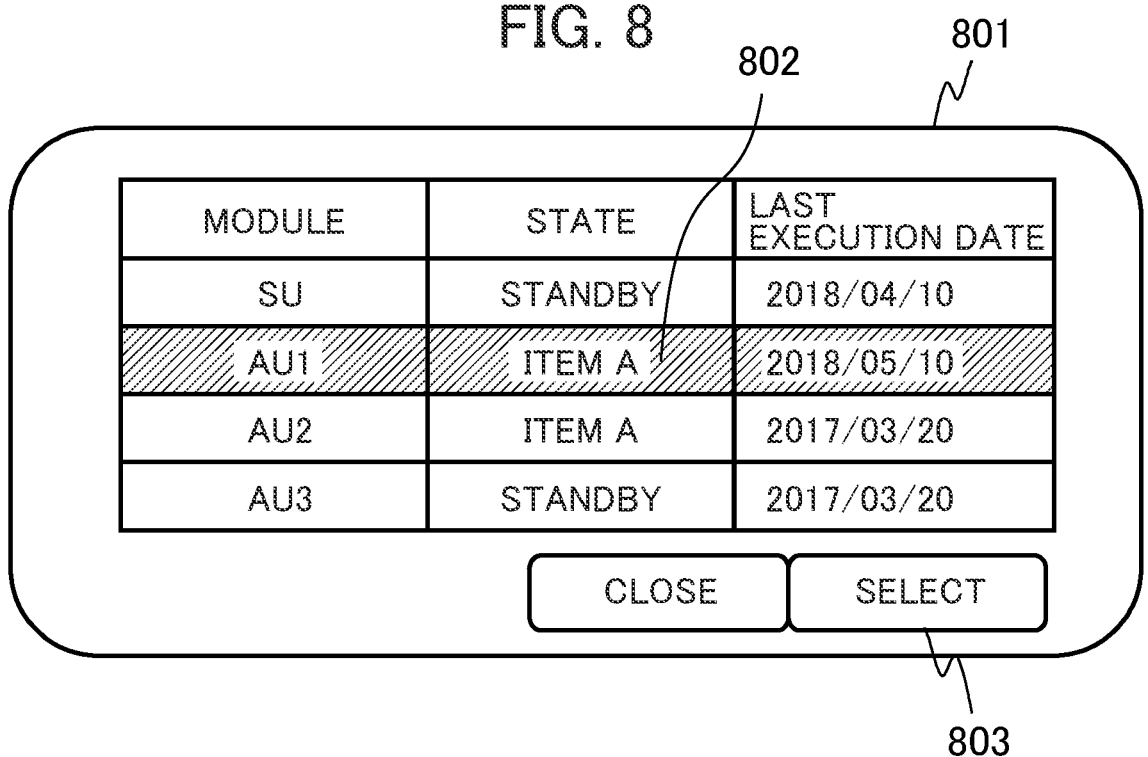
FIG. 8 is a diagram showing a maintenance status confirmation screen of the automatic analyzer according to the present embodiment.

When recognizing that the user has pressed the maintenance button 702, which is displayed with the change in color, the overall management computer 28 allows a maintenance status confirmation screen 801 shown in FIG. 8 to be displayed.

The maintenance button 702 may be blinked, or may be highlighted by other methods. The present embodiment shows an example in which the module button 602 is displayed with a change in the display pattern.

As a result, the user can confirm the user action notification status for maintenance that has been completed even during implementation of other operations.

Further, since the present embodiment is directed to a case in which at least two or more of the analysis modules 24, 25, and 26 to be subjected to the execution of the maintenance, a case of first transitioning to the maintenance status confirmation screen 801 shown in FIG. 8 when the maintenance button 702 has been pressed will be described. When only one module is to be subjected to the execution of maintenance, if the maintenance button 702 has been pressed, the screen can transition directly to the maintenance execution screen 601 shown in FIG. 6.

In a system state 703 in FIG. 6, a device state of the entire system is shown. With confirmation of the information displayed in the system state 703, the user can confirm the state of the system.

Further, in remaining time information 704 in FIG. 6, a remaining time of maintenance during execution is displayed. The user can predict a time at which the maintenance currently during execution is terminated by confirming the above information. When the time indicated in the remaining time information 704 has elapsed, the system transitions to a standby state.

A maintenance status confirmation screen 801 shown in FIG. 8 is a screen displayed when the module button 60 is pressed. The user can confirm an analysis module to be subjected to the user action notification by confirming an analysis module status information button 802.

The analysis module status information button 802 is an area in which information related to the maintenance execution status of at least the analysis modules 24, 25, and 26 is displayed.

On the maintenance status confirmation screen 801 of FIG. 8, the sampler module SU and the analysis module AU3 are in the standby state and the last maintenance execution dates are indicated. In the analysis module AU1, the maintenance of an item A is currently under execution, and the execution of the user action notification is clearly expressed by highlighting. In addition, the last execution date of the maintenance of the item A is indicated. Also, in the analysis module AU2, it is clearly expressed that the maintenance of the item A is currently under execution. Since the AU2 is not subjected to the user action notification, no specific highlighting is performed.

The user selects the confirmed analysis module with using the analysis module status information button 802, and presses a selection button 803 so that the user action notification in the target analysis module can be displayed, that is, the maintenance execution screen 601 shown in FIG. 6 can be displayed.

The user confirms the notification display displayed in the user action notification area 603 of the maintenance execution screen 601 shown in FIG. 6, and can continuously carry out the maintenance operation.

When there are two or more modules that require the user action notification for the user, it is desirable to highlight the analysis module status information button 802 in FIG. 8 for all the target modules. In that case, when any one of the highlighted analysis module status information buttons 802 is pressed, a maintenance execution screen 1001 as shown in FIG. 9 is displayed.

Figure 9:
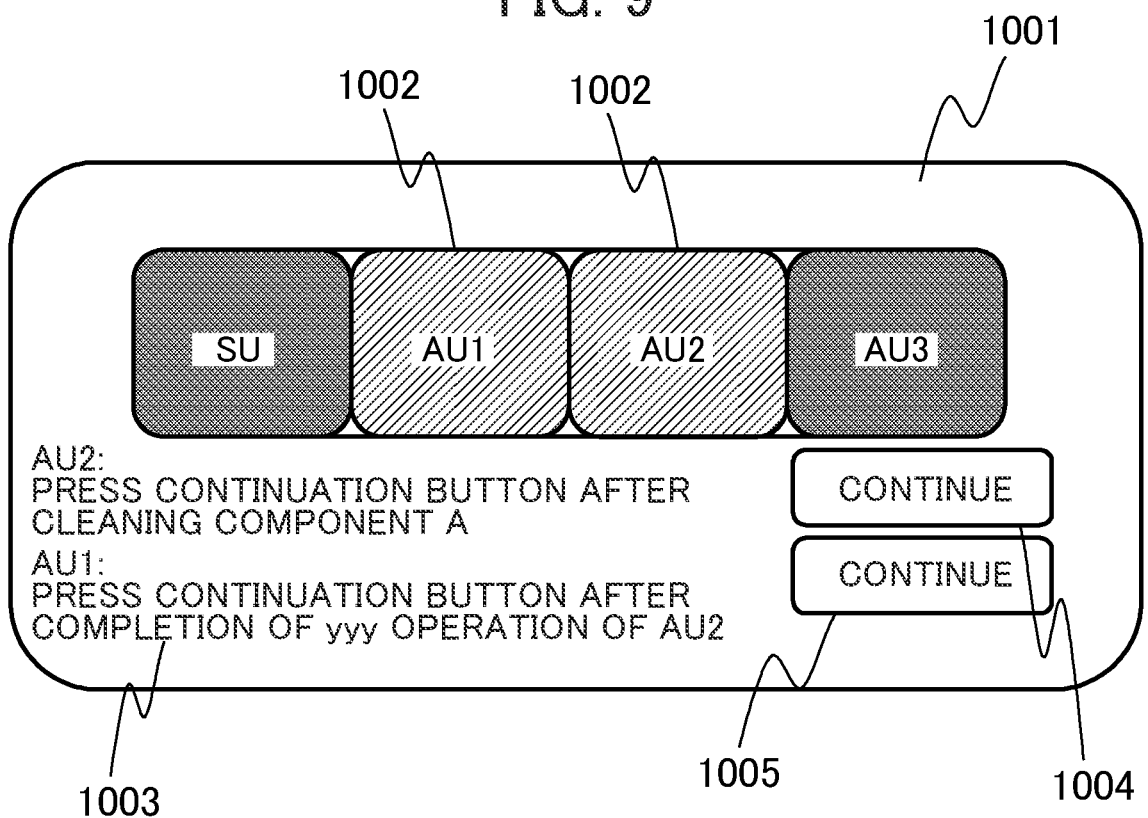
FIG. 9 is a diagram showing a screen for instructing an operation order of multiple analysis modules to a user of the automatic analyzer according to the present embodiment.

In the maintenance execution screen 1001 shown in FIG. 9, all module buttons 1002 of the modules requiring the user action are highlighted. As a result, it can be confirmed for which of the analysis modules the user action notification is displayed.

Further, in a user action notification area 1003, the operation order for the multiple analysis modules is specified for the user. First, as shown in FIG. 9, two works of "cleaning a component A for the analysis module of the AU2" to be first executed and "pressing a continuation button 1005 after the completion of yyy operation of the AU2 for the analysis module of the AU1" to be performed after the cleaning are displayed in order.

In the user action notification area 1003, ranking is performed and the operation order is clearly indicated by numbers so that the order of works can be displayed in a more understandable manner.

The user first cleans the component A of the AU2 based on the information displayed in the user action notification area 1003. After the completion of cleaning, the user presses a continuation button 1004. Thereafter, the maintenance operation of the AU2 is resumed, and when the yyy operation in the AU2 has been completed, the user presses a continuation button 1005. As a result, the maintenance can be promoted in advance.

On the maintenance execution screen, operation guide information registered by the user in advance can be described together. This will be described below with reference to FIG. 10.

Figure 10:
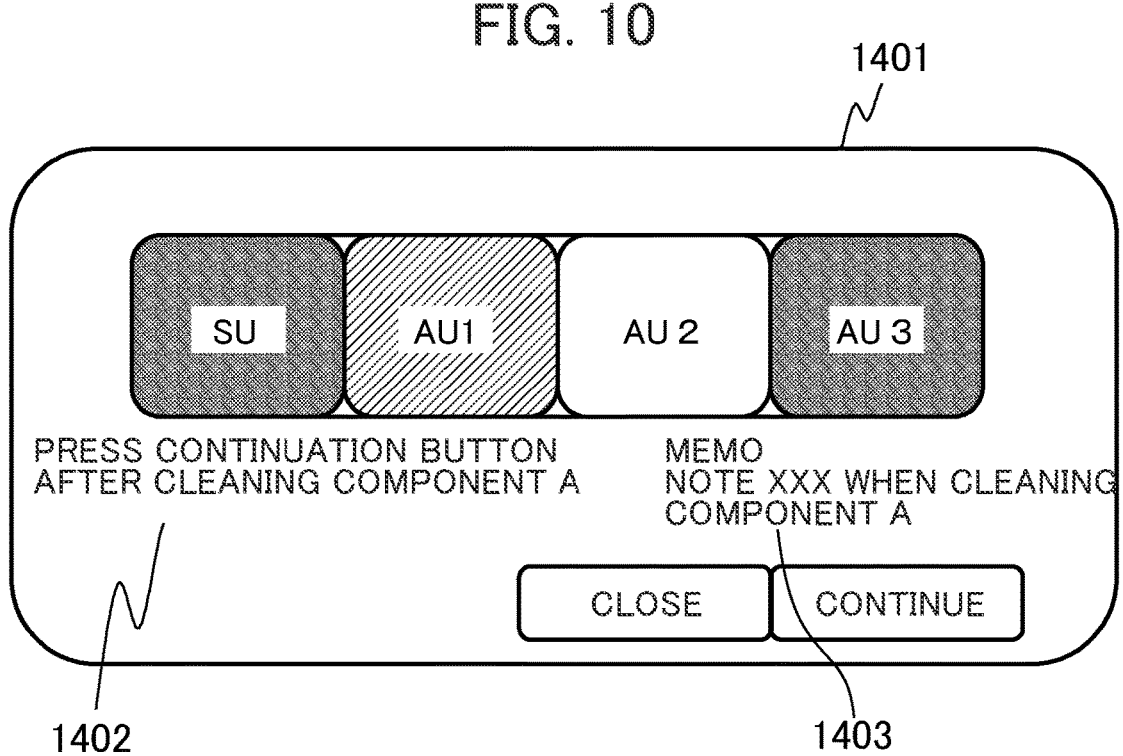
FIG. 10 is a diagram showing a screen presenting operation guide information registered by the user in advance together when implementing a user action presentation of the automatic analyzer according to the present embodiment.

In the maintenance execution screen 1401 shown in FIG. 10, when the user action notation is implemented, the operation guide information registered by the user in advance is described together.

A user action notification area 1402 is an operation instruction defined by the system, which is information provided to a user side from the same device as that of the information displayed in the user action notification area 603 in FIG. 6 and the information displayed in the user action notification area 1003 in FIG. 9.

On the other hand, an operation guide information 1403 is information registered in advance by the user, and for example, registers in advance information on "xxx" about which the user feels to be careful when cleaning the component A in the past, to thereby notify the user of points of concern when cleaning the component A.

Figure 11:
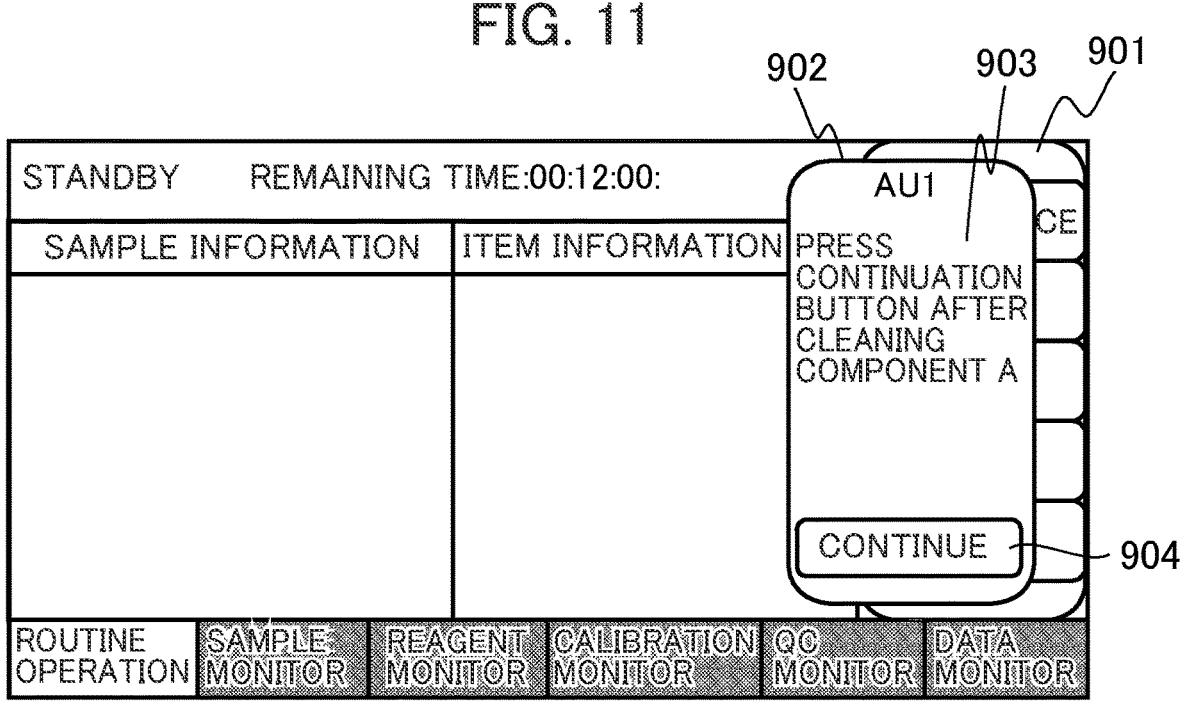
FIG. 11 is a diagram showing a user action notification screen using a pop-up of the automatic analyzer according to the present embodiment.

Another example of the screen for implementing the display control of the user action notification (notification information) using the constant display area will be described with reference to FIG. 11.

During the maintenance executed in a background when the screen other than the maintenance screen is displayed, a work required to be carried out by the user himself is required, the overall management computer 28 displays a pop-up area 902 including a user action notification 903 in a global area 901 always displayed regardless of the display screen when implementing the display control of the user action notification.

The user cleans the component A based on a message of "press continuation button after cleaning component A" disposed in the user action notification area 603, and presses the continuation button 904 after completing the cleaning to continue the maintenance.

Figure 12:
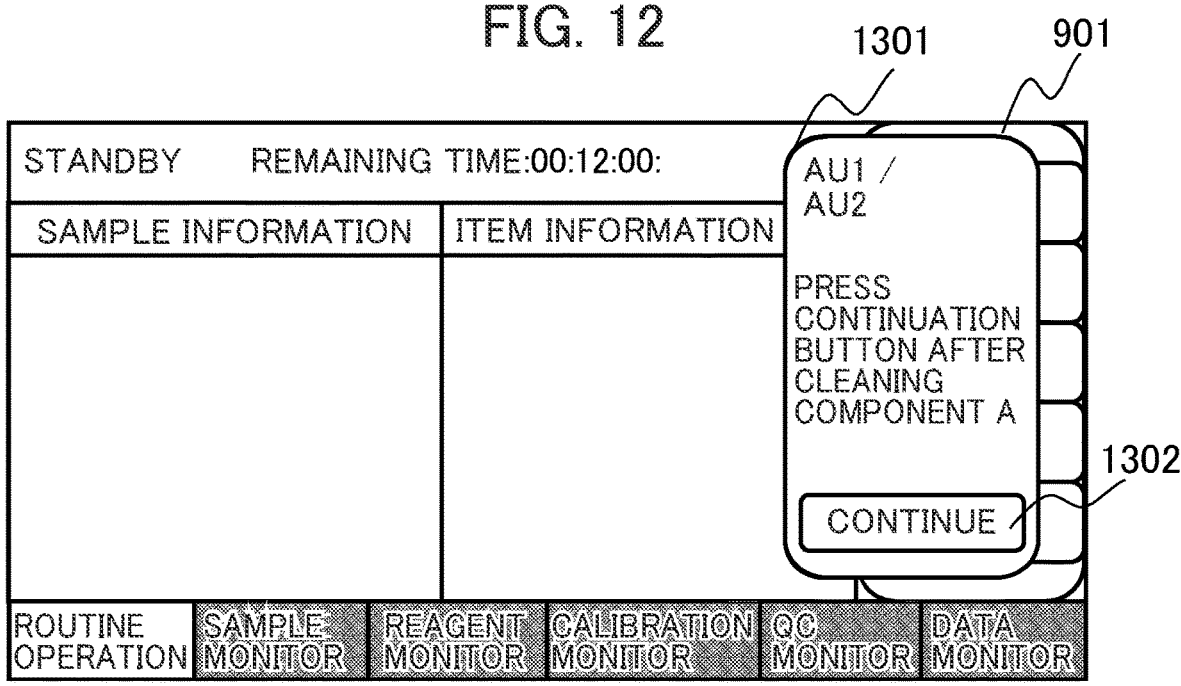
FIG. 12 is a diagram showing a screen displaying information for multiple analysis modules on one operation screen together when implementing the user action presentation for the multiple analysis modules in the automatic analyzer according to the present embodiment.

When using such a pop-up, if there are two or more modules required to give the user the user action notification, a pop-up area 1301 shown in FIG. 12 is displayed instead of the pop-up area 902.

As shown in FIG. 12, the user action notifications for the multiple analysis modules are displayed together in the pop-up area 1301.

With pressing an approval button 1302, approval for the multiple analysis modules can be carried out collectively.

Even when the pop-up areas 902 and 1301 described above are used, the operation order for the multiple units may be displayed as in the user action notification area 1003 of FIG. 9, or information registered in advance by the user may be displayed as in the operation guide information 1403 of FIG. 10.

Figure 13:
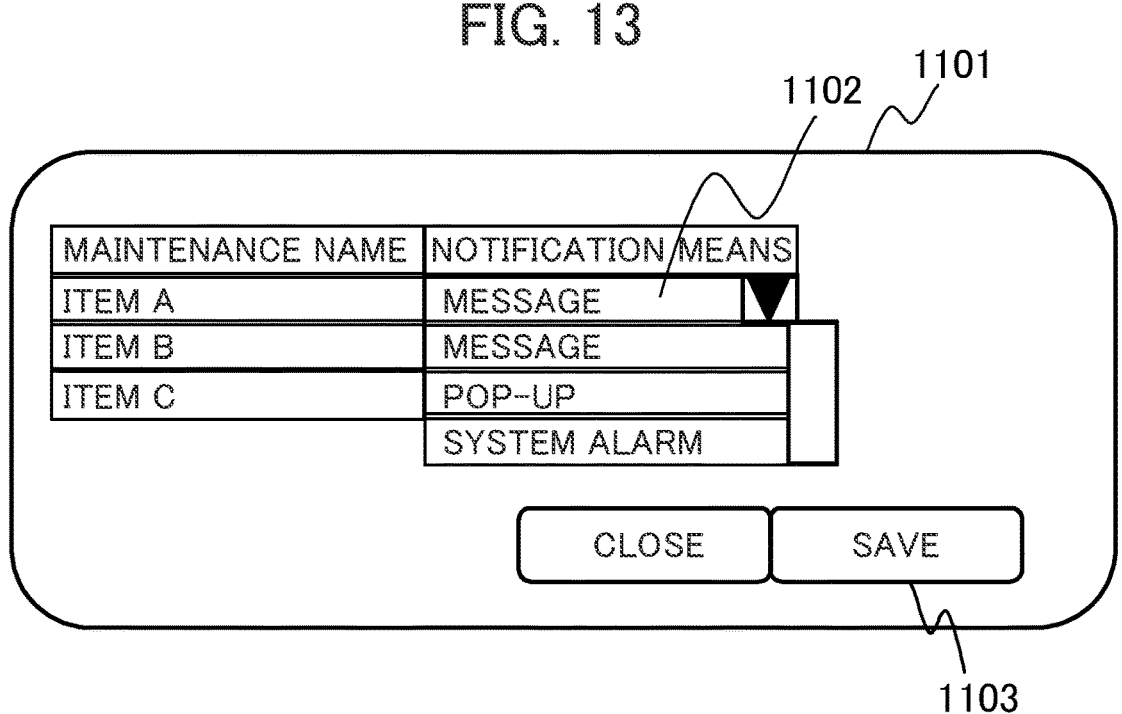
FIG. 13 is a diagram showing a screen for registering means for notifying the user action notification in advance in the automatic analyzer according to the present embodiment.
Figure 14:
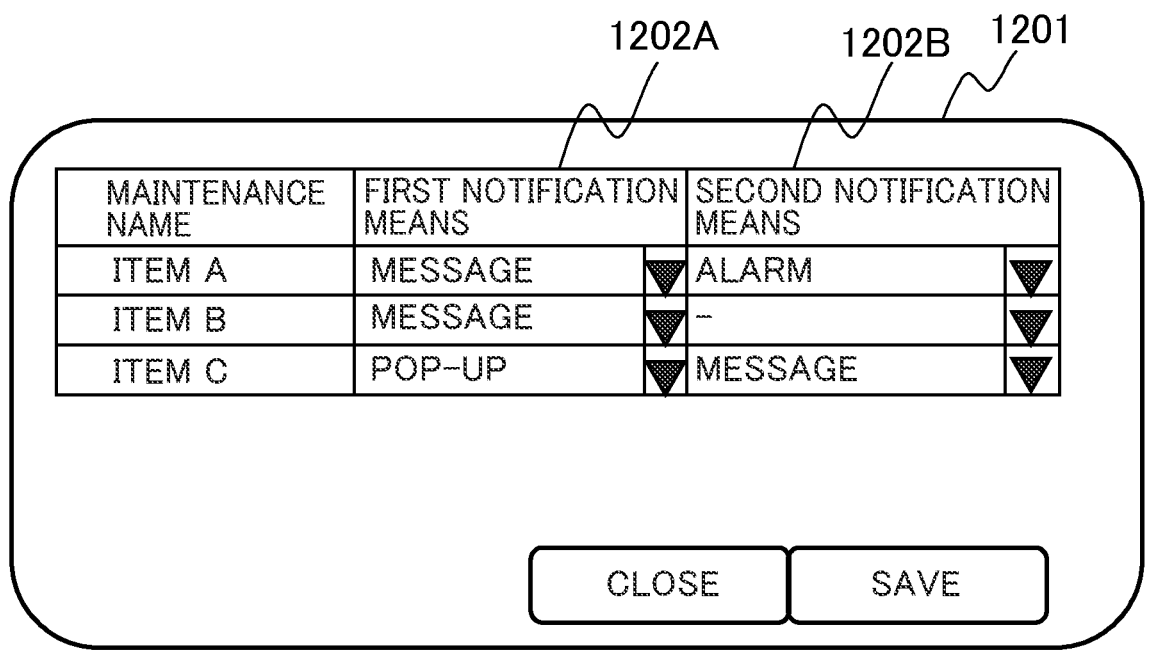
FIG. 14 is a diagram showing a screen for registering multiple means for notifying the user action notification in advance in the automatic analyzer according to the present embodiment.

Next, a method for selecting how to notify the notification information will be described with reference to FIGS. 13 and 14. FIG. 13 is a diagram showing one example of means for pre-registering means for notifying the user action notification, and FIG. 14 is a diagram showing another example of means for pre-registering multiple means for notifying the user action notification.

The general management computer 28 displays a selection screen 1101 for selecting how to notify the notification information. In the example shown in FIG. 13, as notification means 1102 for the notification information, any one of three notification methods including "message" (FIG. 7, etc.), "pop-up" (FIG. 11, etc.), and "system alarm" can be selected. When the selected notification method is saved, a save button 1103 is selected.

Also, multiple notification methods for each maintenance can be registered for each maintenance on the selection screen. On a selection screen 1201 shown in FIG. 14, first notification means 1202A and second notification means 1202B can be registered for each maintenance.

In that case, the first notification means 1202A first notifies the display control for the user action notification, and when an approval is not carried out by the user even after a predetermined period time has been elapsed, the second notification means 1202B implements the notification, and can again implement the action notification for the user.

In FIG. 14, the means for registering the first notification means 1202A and the second notification means 1202 has been described, but two or more notification means can be provided.

Further, a time since the notification by the first notification means 1202A till the notification by the second notification means 1202B can be arbitrarily set. It is needless to say that when two or more notification means can be registered, times between the notifications by all the notification means can be arbitrarily set.

Next, the effects of the present embodiment will be described.

The automatic analyzer 1 according to the present embodiment described above includes the analysis modules 24, 25, and 26 that analyzes a sample, the display device 30 that displays information related to maintenance in the analyzer including the analysis modules 24, 25, and 26, and the overall management computer 28 that controls the global areas 701 and 901 to be displayed on a display screen of the display device 30, and when there is a need to notify a user of a maintenance status at a timing when the maintenance in the analyzer is executed in a background and a screen other than a maintenance screen is displayed on the display device 30, the overall management computer 28 displays notification information on the screen including the global areas 701 and 901 of the display device 30.

As a result, even when other operations are being performed in parallel with the maintenance operation, the presence of the user action notification can be simply and surely notified the user of. In addition, the user can easily move to the maintenance execution screens 601, 1001, and 1401, and the user action notification 903 by highlighting the maintenance button 702 or displaying the hop-up area 902, and can quickly carry out the required maintenance operation.

In other words, since the user can smoothly navigate from a screen other than the maintenance screen to an interactive maintenance screen, which has been difficult with the conventional art, the effective maintenance operations can be performed.

In addition, in the display of the notification information, since the maintenance button 702 related to the maintenance displayed in the global area 701 is highlighted, even if another screen is operated, the presence of the user action notification can be notified the user of in a visual way that draws attention, thereby being capable of more smoothly shifting to the maintenance execution screens 601, 1001, and 1401.

Further, the overall management computer 28 allows the maintenance execution screens 601, 1001, and 1401 to be displayed by pressing the maintenance button 702, thereby being capable of transitioning to the execution screen with a simple operation.

In addition, since the operation to be next carried out by the user is displayed on the maintenance execution screens 601, 1001, and 1401, the user can easily grasp what the work required to be carried out by the user himself is, and can rapidly execute the work so that the maintenance can be smoothly advanced.

Further, the overall management computer 28 allows the maintenance status confirmation screen 801 including information on the execution status of the maintenance of at least the analysis modules 24, 25, and 26 to be displayed when the maintenance button 702 is pressed, and thereafter allows the maintenance execution screens 601, 1001, and 1401 to be displayed. As a result, even when there are multiple analysis modules, or the maintenance operation screen displayed is different according to the maintenance item, it can be easily grasped which of the target analysis module is of interest.

When at least two of the analysis modules 24, 25, and 26 are to be subjected to the execution of maintenance, the overall management computer 28 displays the maintenance status confirmation screen 801 when the button 702 is pressed, and highlights the analysis modules 24, 25, and 26 to be notified of the maintenance status even on the maintenance status confirmation screen 801. This makes it possible to grasp more easily which of the analysis modules is of interest, and makes it possible also to smoothly shift to the maintenance execution screens 601, 1001, and 1401.

Further, on the maintenance execution screen 1401, operation guide information 1403 is displayed in addition to the operation to be executed next by the user. This makes it possible to further improve operability and improve the effectiveness of maintenance.

In addition, highlighting is performed by at least one of blinking the maintenance button 702 and changing a display color of the maintenance button 702, thereby being capable of notifying the user in a visually easy-to-understand manner.

Furthermore, when maintenance using multiple analysis modules 24, 25, and 26 is implemented, the operation order of the multiple analysis modules 24, 25, and 26 is instructed to the user on the maintenance execution screens 601, 1001, and 1401 so that the user operation can be guided according to the instruction. Therefore, the maintenance can be smoothly executed even in complicated situations.

In addition, in the display of the notification information, even when the pop-up area 902 is displayed on the screen on which the global area 901 is displayed, the presence of the user action notification can be notified the user of in a visual way that draws attention, thereby being capable of more smoothly starting the maintenance that requires the user work.

Further, the overall management computer 28 displays an execution status of the maintenance of at least the analysis modules 24, 25, and 26 and an operation to be next executed by the user so that the user can easily grasp which of the analysis modules is of interest, and easily grasp what a work to be carried out by the user himself is.

Further, in the pop-up area 902, when the multiple analysis modules 24, 25, and 26 are displayed in the pop-up area 902, the multiple analysis modules 24, 25, and 26 are displayed together so that the notation area can be minimized, and the user action notification can be grasped smoothly.

Further, the overall management computer 28 displays the selection screen 1101 for selecting how to notify the notification information so that the action notification to the user can be carried out according to the notification means registered in advance when implementing each maintenance, and the notification means according to the user's operation can be applied.

Further, on the selection screen 1101, the multiple notification methods can be registered so that when each maintenance is implemented, the notification can be performed by stages according to the notification means registered in advance. Therefore, the notification can be surely transmitted to the user.

In particular, the notification order of the multiple notification methods can be registered on the selection screen 1101 so that the notification to the user is surely carried out in a manner more tailored to the operation.

<Others>

The present invention is not limited to the above embodiments, and various modifications and applications can be made. The embodiments described above are described in detail in order to describe the present invention in an easy-to-understand manner, and the present invention is not necessarily limited to those with all the configurations described.

LIST OF REFERENCE SIGNS

1 . . . automatic analyzer
21 . . . sample rack input unit
22 . . . ID reading unit
23 . . . transportation line
24, 25, 26 . . . analysis module
27 . . . sample rack collection unit
28 . . . overall management computer (control unit)
29 . . . operation unit
30 . . . display device
31 . . . storage device
32 . . . printing device
109 . . . reaction disk
110 . . . reaction vessel
111 . . . reagent disk
112 . . . reagent bottle
113 . . . sample dispensing probe
114 . . . stirring device
115 . . . cleaning device
116 . . . light source
117 . . . multi-wavelength photometer
118 . . . reagent dispensing probe
119 . . . rack transportation belt
120 . . . sample rack
121 . . . sample container
122 . . . interface
123 . . . computer
124 . . . A/D converter
401 . . . maintenance item button
402 . . . selection button
501 . . . maintenance execution screen
502 . . . execution target analysis module selection button
504 . . . execution button
601 . . . maintenance execution screen (maintenance operation screen)
602 . . . module button 603 . . . user action notification area (notification information)
604 . . . continuation button
701 . . . global area (constant display area)
702 . . . maintenance button
703 . . . system state
704 . . . remaining time information
705 . . . sample/item information display area
801 . . . maintenance status confirmation screen
802 . . . analysis module status information button
803 . . . selection button
901 . . . global area (constant display area)
902 . . . pop-up area
903 . . . user action notification (notification information)
904 . . . continuation button
1001 . . . maintenance execution screen (maintenance operation screen)
1002 . . . module button
1003 . . . user action notification area
1004 . . . continuation button
1005 . . . continuation button
1101 . . . selection screen
1102 . . . notification means
1103 . . . save button
1201 . . . selection screen
1202A . . . first notification means
1202B . . . second notification means
1301 . . . pop-up area
1302 . . . approval button
1401 . . . maintenance execution screen (maintenance operation screen)
1402 . . . user action notification area
1403 . . . operation guide information

The invention claimed is:

1. An automatic analyzer comprising:
an analysis unit that analyzes a sample;
a display device; and
a control unit coupled to the display device,
wherein the control unit is configured to:
execute a maintenance operation of the analysis unit;
control the display device to display a screen including a constant display area which includes a plurality of display items that do not change, and an information display area adjacent to the constant display area, and
upon determining a notification of a maintenance status is necessary during the maintenance operation and while the information display area of the screen is displaying information other than maintenance operation information of the maintenance operation, control the information display area to display notification information of the maintenance operation on the screen of the display device.

2. The automatic analyzer according to claim 1,
wherein one of the display items of the constant display area is button indicating the maintenance operation, and
wherein the control unit is configured to cause the button to be is highlighted upon display of the notification information.

3. The automatic analyzer according to claim 2,
wherein the control unit is configured to cause maintenance operation information to be displayed in the information display area upon determining the button is pressed.

4. The automatic analyzer according to claim 3,
wherein an operation to be executed next by the user is displayed by the maintenance operation information.

5. The automatic analyzer according to claim 3,
wherein the control unit is configured to cause a maintenance status screen including at least information of an execution status of the maintenance of the analysis unit to be displayed upon determining the button is pressed, and thereafter causes the maintenance operation information to be displayed.

6. The automatic analyzer according to claim 5, further comprising:
at least two or more of the analysis units including the analysis unit,
wherein the controller is configured to:
execute respective maintenance operations on the at least two analysis units,
cause the maintenance status screen to be displayed upon determining the button is pressed, and highlight one of the two or more analysis units that is subjected to the notification of the maintenance status.

7. The automatic analyzer according to claim 4,
wherein the control unit is configured to display operation guide information is in the maintenance operation information in addition to the operation to be executed next by the user.

8. The automatic analyzer according to claim 3, further comprising:
at least two analysis units including the analysis unit,
wherein upon executing the maintenance operations of the two or more analysis units, an operation order of plurality of analysis units is instructed to the user in the maintenance operation information.

9. The automatic analyzer according to claim 2,
wherein the highlight includes at least one of blinking the button or changing a display color of the button.

10. The automatic analyzer according to claim 1,
wherein the control unit is configured to, in displaying the notification information, display a pop-up area on the constant display area.

11. The automatic analyzer according to claim 10,
wherein the control unit is configured to display an operation to be executed next by the user in the pop-up area.

12. The automatic analyzer according to claim 11, further comprising:
at least two analysis units including the analysis unit,
wherein the control unit is configured to collectively display information of the two or more analysis units upon displaying the plurality of analysis units in the pop-up area.

13. The automatic analyzer according to claim 1,
wherein the control unit is configured to display a selection screen for selecting how to notify the notification information.

14. The automatic analyzer according to claim 13,
wherein the control unit is configured to, receive a selection of and register, via the selection screen, a plurality of notification methods.

15. The automatic analyzer according to claim 14,
wherein the control unit is configured to, receive a selection of and register, via the selection screen, a notification order of the plurality of notification methods.

* * * * *